United States Patent

Jelinek et al.

[15] 3,656,769
[45] Apr. 18, 1972

[54] FLUID SEALING JOINT AND GASKET

[72] Inventors: Jerry G. Jelinek, Whittier; Gary L. Duesenberry, Canoga Park; Thomas J. McCuistion, Marina Del Rey, all of Calif.

[73] Assignee: Parker-Hannifin Corporation, Cleveland, Ohio

[22] Filed: Sept. 30, 1968

[21] Appl. No.: 763,647

[52] U.S. Cl. ............................277/207, 277/209, 277/211, 277/236
[51] Int. Cl. ................F16l 19/00, F16j 15/00, B65d 53/00
[58] Field of Search..................277/207, 211, 236, 208, 209; 285/DIG. 11, DIG. 18

[56] References Cited

UNITED STATES PATENTS

| 1,731,404 | 10/1929 | Wetherill | 277/207 |
| 3,151,869 | 10/1964 | Butcher | 277/209 |
| 2,543,963 | 3/1951 | Gaffin | 277/211 |
| 3,195,906 | 7/1965 | Moyers | 277/211 |
| 3,215,442 | 11/1965 | Papenguth | 277/211 |
| 306,293 | 10/1884 | Tennant et al. | 277/211 |
| 1,454,187 | 5/1923 | Poppe et al. | 285/DIG. 11 |
| 2,307,440 | 1/1943 | Wilson | 277/211 |
| 2,604,507 | 7/1952 | Tyson | 277/236 |

FOREIGN PATENTS OR APPLICATIONS

| 342,721 | 4/1904 | France | 277/211 |
| 563,738 | 11/1932 | Germany | 277/211 |
| 935,356 | 8/1963 | Great Britain | 277/211 |

Primary Examiner—Carlton R. Croyle
Assistant Examiner—John J. Vrablik
Attorney—John N. Wolfram

[57] ABSTRACT

A sealed joint between a pair of members in which one member has a raised rib for sealing contacting the other member at one location and has a predetermined clearance with the other member at another location, one of the members being yieldable under clamping pressure to take up the clearance upon application of predetermined pressure upon the rib. The invention also provides means for achieving substantially equal unit sealing pressure throughout the length of the rib despite uneven yielding of the one member.

9 Claims, 10 Drawing Figures

PATENTED APR 18 1972 3,656,769
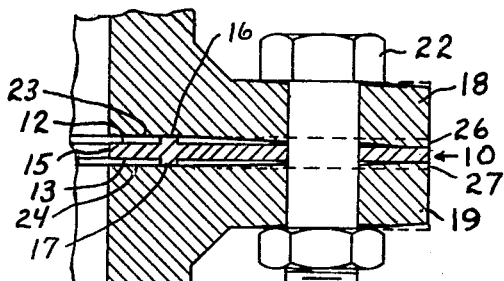
Fig. 2
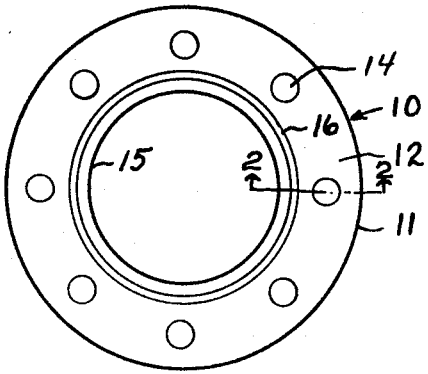
Fig. 1
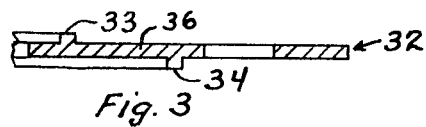
Fig. 3
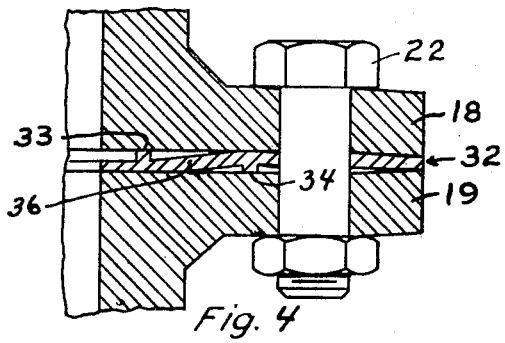
Fig. 4
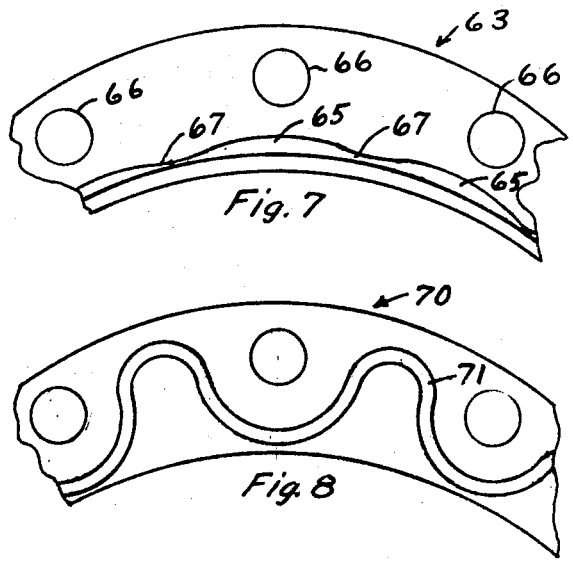
Fig. 7
Fig. 8
Fig. 9
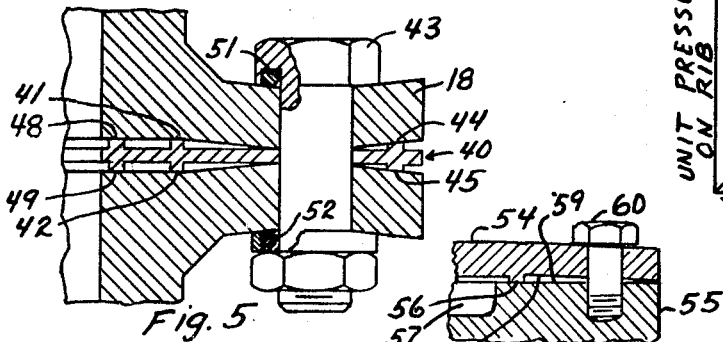
Fig. 5
Fig. 6
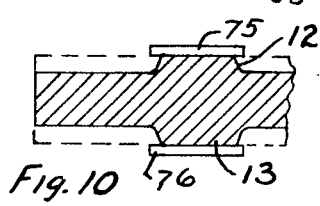
Fig. 10
INVENTORS
JERRY G. JELINEK
GARY L. DUSENBERRY
THOMAS J. McCUISTION
BY
John N. Wolfram
ATTORNEY

FLUID SEALING JOINT AND GASKET

BACKGROUND OF THE INVENTION

To achieve a sealed joint between certain types of members, such as a pair of flanged pipes, a cylinder block and cylinder head, etc., it is frequently desirable or necessary to avoid the use of a gasket of non-metallic material because of temperature or corrosive fluids that are encountered. In such cases, it is known to provide a metal gasket having ribs to establish sealing contact of high unit pressure. However, because of the difficulty of machining the parts to very close dimensional tolerances with machinery and methods that have been available in the past, it has not been practical to attempt to limit the unit pressure upon the ribs to a value sufficient for sealing but not so high as to prevent damage to the gasket and/or the members being sealed.

SUMMARY OF THE INVENTION

It has been found that the use of chemical milling provides an inexpensive and highly efficient method of accurately controlling the width and height of the ribs whereby unit sealing pressures on the rib can be controlled within desired limits. This is accomplished by calculating the force required to be applied by the bolts to attain the desired unit sealing pressure on the rib, determining the deflection that will occur in the flanges when the bolts are tightened the proper amount for attaining the desired pressure on the rib, and making the rib height such that there will be an initial clearance between the parts that will be taken up when the flanges have deflected the calculated amount. The invention also permits of additional pressure to be applied to the rib after such clearance is taken up.

Chemical milling also permits the ribs to be so shaped as to compensate for unequal yielding of the parts that would otherwise result in unequal unit stress applied to the ribs at various locations therealong. Thus, for example, the ribs may be made of varying width or with a special path to effect such compensation.

DESCRIPTION

FIG. 1 is a plan view of one form of gasket utilized in this invention.

FIG. 2 is an enlarged fragmentary section view along the line 2—2 of FIG. 1 when the gasket of FIG. 1 is clamped between two sections of flanged pipe.

FIG. 3 is a cross section view corresponding to lines 2—2 of FIG. 1 of a modified form of gasket.

FIG. 4 is an enlarged fragmentary section view showing the gasket of FIG. 3 clamped between two sections of flanged pipe.

FIG. 5 is an enlarged fragmentary section of a further modified form of gasket clamped between sections of flanged pipe.

FIG. 6 is a fragmentary section view of a joint between a container and a cover.

FIG. 7 is a fragmentary plan view of another form of gasket in which the rib is of varying width to achieve uniform unit pressure therealong.

FIG. 8 is a fragmentary plan view of another form of gasket in which the rib follows a special path to achieve uniform unit pressure.

FIG. 9 is a graph showing the relation of sealing pressure on the rib relative to bolt pressure.

FIG. 10 shows how a gasket may be formed by chemical milling.

The gasket 10 shown in FIGS. 1 and 2 may be of any desired metal. As illustrated, it comprises a body 11 having first and second surfaces 12, 13 with bolt holes 14 and a fluid flow passage 15 therethrough. A first annular rib 16 projects from surface 12 and a second annular rib 17 projects from surface 13 directly opposite the first rib.

FIG. 2 shows gasket 10 assembled between first and second pipe flanges 18 and 19 with the dotted lines indicating the initial position of the flanges before bolts 22 are tightened. In this condition, when the initially flat and planar surfaces 23, 24 of the flanges initially contact ribs 16, 17 there will be predetermined clearances 26, 27, equal to the height of ribs 16, 17 between gasket surfaces 12, 13 and flange surfaces 23, 24.

Upon tightening of bolts 22, flange surfaces 23, 24 will exert a sealing pressure against ribs 16 and 17. It has been found that with surface finishes of 125 microinches RMS or less the unit pressure applied by the flanges to ribs 16, 17 need only be about three times the compression yield strength of the gasket material in order for the ribs to plasticly deform into the imperfections of the flange surfaces and establish an effective fluid seal.

During tightening of bolts 22 there will be a cantilever type bending or yielding of flanges 18, 19 from a support point of ribs 16, 17 to the flange outer margins. With this being the case, the height of ribs 16, 17 is made so that at the load required to be exerted by bolts 22 for applying the desired unit stress to ribs 15, 16, it will be equal to the maximum deflection of the flanges whereupon the predetermined clearances will be taken up and the outer margin of the flanges will contact the outer margin of the gasket.

This may be visually observed by the assembler and constitute an indication to him that the bolts have been sufficiently tightened.

During tightening of the bolts, the increase in unit pressure upon the ribs will increase with respect to the increase in bolt torque according to portion A of the curve in FIG. 9. When the flange outer margins contact the gasket as aforesaid, further tightening of the bolts will cause clamping pressure to be applied to the gasket outer margin as well as to the rib and result in a dividing of the additional bolt pressure between these locations whereby the bolt pressure vs. sealing pressure at the rib will be similar to part B of the FIG. 9 curve and thus possibility of damage to the ribs by overtightening of the bolts is markedly decreased.

The gasket 32 of FIGS. 3 and 4 is similar to that of FIG. 1 except that annular ribs 33, 34 are radially offset from one another. When the joint is assembled, there will again be initial clearances between the flange and gasket surfaces equal to the height of ribs 33, 34. When bolts 22 are tightened, the flanges will bend slightly to contact the gasket at their outer margins but also, the section 36 of the gasket between ribs 33, 34 will bend, as shown in FIG. 4. The combined bending of the gasket and the flanges in this case results in spring tension tending to maintain sealing pressure at the ribs despite slight stretch of the bolts when fluid pressure within the pipes tends to separate the joint. Contact of the flange outer margins with the outer margin of the gasket indicates that proper tightening has been accomplished and further tightening will present proportionately less load to the ribs, as in the case of FIG. 2.

FIG. 5 shows another form of gasket 40 having a pair of opposed ribs 41, 42 interiorly of bolts 43 and another pair 44, 45 exteriorly. In this case, flanges 18, 19 when tightened will undergo bow-like deflection and contact the gasket intermediate the interior and exterior ribs. If desired, another pair of opposed ribs 48, 49 may be provided interiorly of ribs 41, 42. Similarly, additional ribs may be applied interiorly of those shown in FIGS. 2 and 3.

Because ribs 44, 45 are exterior of bolts 43 in FIG. 5, it will be necessary to seal the bolts with suitable packings 51, 52 when it is desired that these ribs serve as a secondary seal.

FIG. 6 illustrates the invention as applied to a cover 54 for a container 55. In this case, rib 56 is shown to be on the cover but alternatively it could be on the container. The rib surrounds a cavity 57 in the container. Surface 58 on the cover is initially parallel with surface 59 of the container when rib 56 is in light contact with surface 59 and spaced therefrom a distance determined by the height of the rib and so selected that when bolt 60 is tightened sufficiently to impose a force upon rib 56 equal to about three times the compressive yield strength of the rib, cover 54 will deflect so that the outer margins of surfaces 58, 59 will contact as shown.

FIG. 7 illustrates a portion of a circular gasket 63 usable, for example, with flanges 18, 19 and in which the width of rib 64 varies from a maximum at locations 65 radially opposite bolt holes 66 to a minimum at locations 67 between the bolt holes so as to compensate for unequal transmission of force from the flanges to the rib. Thus, with reference to FIG. 2, when bolts 22 are tightened, each bolt imposes a bending force to flanges 18, 19. The moment arm for this force at each bolt is the radial distance from ribs 12, 13 to the bolt. However, some bending occurs in the flanges circumferentially between the bolts and thus there is slightly less cantilever type bending of the flanges between the bolts than at the bolts. Consequently, the force applied by the flanges to the ribs 12, 13 between the bolts is less than radially opposite the bolts. To compensate for this difference, which is progressive from the bolt locations to the between bolt locations, the ribs may have a greater width at the bolt locations that progressively narrows to a minimum width between bolt locations. The minimum and maximum widths are so selected that the unit pressures exerted on the ribs at any given location are substantially equal to the unit pressures thereon at other locations despite the difference in total force exerted at such locations.

FIG. 8 illustrates another method of compensating for unequal forces that would be otherwise applied to the ribs at various locations with relation to the bolts. In this instance, the flange 70 has a rib 71 that follows a path such that the distance from the rib to the bolt holes is substantially the same between the bolts as at the bolts whereby the bending moment arm between the rib and bolts is substantially the same so that the unit force applied by the flanges to the ribs is substantially the same at all locations.

The rib heights and the amount of flange bending are exaggerated in the drawings for purposes of illustration. Actually, the rib heights may be on the order of .005 inch with a tolerance of ±.001 inch and the width about .015 inch ±.002 inch. Such tolerances are very difficult to attain with normal metal cutting techniques but can readily be accomplished with chemical milling.

FIG. 10 illustrates how chemical milling is utilized for making the gasket of FIG. 1. In this case, a plate having an initial thickness illustrated by the dotted lines and equal to the thickness across ribs 12, 13 have masks 75, 76 applied thereto that are of a width slightly greater than the desired rib width. The masked plate is then immersed in a chemical solution, which may be an acid or an alkali, for the required time for removing metal from the unmasked part of the plate of a thickness equal to the desired height of the ribs. As the ribs are being formed by such metal removal, the chemical solution also acts on the sides of the ribs to gradually decrease their width to less than that of the masks and the plate will assume a cross section at the ribs as shown by the solid lines in FIG. 10.

Because of the relative ease with which masks of any desired configuration may be formed, and the ease of controlling the exact depth to which metal is to be removed by the chemical milling process, it is a simple and inexpensive matter to produce gaskets with ribs of shapes and sizes for high performance as herein illustrated and described.

I claim:

1. A joint comprising a pair of members at least one of which has a cavity for containing fluid and at least one having a bendable portion, each member having a surface surrounding the cavity, one of the surfaces having a contact portion and having a rigid rib projecting therefrom into contact with the other surface, said rib being spaced laterally from said contact portion, means between said contact portion and said rib clamping the members against each other, said rib when in contact with said other surface while said clamping means is in untightened condition serving to establish a predetermined clearance between said surfaces, said clearance being such that when the clamping means is tightened sufficiently for causing said other member to impose a predetermined compressive force upon the rib said bendable portion will be bent so as to take up said clearance only at said contact portion and establish contact between said contact portion and said other surface, said rib being sufficiently rigid to retain substantially its initial form under said predetermined compressive force, whereby said clearance is maintained between said rib and said contact portion at said clamping means.

2. The joint of claim 1 in which the bendable portion may be bent additionally after said contact by further tightening of said clamping means whereby additional compressive force is applied to said rib at a lesser rate with relation to the increase in clamping force applied by the clamping means.

3. The joint of claim 1 in which the clamping means includes a plurality of bolts located radially between the rib and said contact portion.

4. The joint of claim 1 in which one of the members is a gasket and there is a third member, and the gasket is clamped between the third and the other of said members.

5. The joint of claim 4 in which said rib is on said gasket and there is another rib on an opposite surface of the gasket that contacts said third member.

6. The joint of claim 5 in which said ribs are radially offset.

7. The joint of claim 1 in which said clamping means comprises a series of circumferentially spaced bolts that exert force through said bendable portion clamping said rib against said other surface, said rib being so shaped and located relative to said bolts that the unit pressure exerted against the rib by said other surface is substantially equal throughout the length of the rib.

8. The joint of claim 7 in which said shaping includes varying the width of the rib whereby the rib is relatively wide at locations close to said bolts and is progressively narrower at locations progressively more distant from said bolts.

9. The joint of claim 7 in which said shaping includes varying of the radial spacing of the rib about its circumference in a manner to have a substantial portion of the rib radially spaced equal amounts from said bolts.

* * * * *